United States Patent
Zhou et al.

(10) Patent No.: US 12,180,238 B2
(45) Date of Patent: Dec. 31, 2024

(54) PROCESS FOR SYNTHESIZING ALKENYL DISILOXANE

(71) Applicant: DOW SILICONES CORPORATION, Midland, MI (US)

(72) Inventors: Xiaoyuan Zhou, Midland, MI (US); Zhanjie Li, Midland, MI (US); Eric Joffre, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 282 days.

(21) Appl. No.: 17/784,082

(22) PCT Filed: Dec. 11, 2020

(86) PCT No.: PCT/US2020/064535
§ 371 (c)(1),
(2) Date: Jun. 9, 2022

(87) PCT Pub. No.: WO2021/119443
PCT Pub. Date: Jun. 17, 2021

(65) Prior Publication Data
US 2023/0056138 A1     Feb. 23, 2023

Related U.S. Application Data

(60) Provisional application No. 62/947,680, filed on Dec. 13, 2019.

(51) Int. Cl.
*C07F 7/08*     (2006.01)
*C07F 7/20*     (2006.01)

(52) U.S. Cl.
CPC .......... *C07F 7/0801* (2013.01); *C07F 7/0896* (2013.01); *C07F 7/20* (2013.01)

(58) Field of Classification Search
CPC .... C07F 7/0801; C07F 7/0874; C07F 7/0896; C07F 7/20
See application file for complete search history.

(56) References Cited

U.S. PATENT DOCUMENTS 2,595,890 A * 5/1952 Sauer .................... C07F 7/0896
556/451

FOREIGN PATENT DOCUMENTS

EP     0546716 A1     6/1993

OTHER PUBLICATIONS

Voronkow, et al. "Cleavage of siloxanes with organyltrifluoro- and diorganyldifluorosilanes", Journal of Organometallic Chemistry, vol. 433, No. 1-2, Jul. 21, 1992, 9 pages.

* cited by examiner

*Primary Examiner* — Pancham Bakshi
(74) *Attorney, Agent, or Firm* — Condo Roccia Koptiw LLP

(57) ABSTRACT

Described herein are methods for making alkenyl disiloxanes, comprising combining an alkenyl halosilane with a bis-hydrido terminated alkyl disiloxane and adding the mixture to water, an acidic aqueous solution, or a basic aqueous solution. The ratio of the alkenyl halosilane to the bis-hydrido terminated alkyl disiloxane is about 1:10 to about 10:1. The alkenyl halosilane and bis-hydrido terminated alkyl disiloxane are mixed at about 20° C. to about 45° C. In an example, no organic solvent is present. The reaction product is separated and washed with saturated $NaHCO_3$ solution (e.g., sodium bicarbonate).

20 Claims, No Drawings

PROCESS FOR SYNTHESIZING ALKENYL DISILOXANE

CROSS REFERENCE TO RELATED APPLICATION

This application is the National Stage Entry under 35 U.S.C. 4371 of Patent Cooperation Treaty Application No. PCT/US2020/064535, filed Dec. 11, 2020, which claims the benefit of Provisional U.S. Patent Application No. 62/947,680, filed Dec. 13, 2019, the disclosures of each of which are incorporated herein by reference in their entireties.

BACKGROUND

Silane monomers are an important group of monomers. Preferred silane monomers have a desirable combination of purity, reactivity, and cost effectiveness. Alkenyl disiloxanes are a class of silane monomers that are particularly useful, for example, as self-polymerizing monomers.

Accordingly, what is needed are new processes for synthesizing alkenyl disiloxanes.

SUMMARY

Described herein are methods for making alkenyl disiloxanes, comprising combining an alkenyl halosilane with a bis-hydrido terminated alkyl disiloxane and adding the mixture to water, an acidic aqueous solution, or a basic aqueous solution.

DETAILED DESCRIPTION

Described herein are methods for making alkenyl disiloxanes, comprising combining an alkenyl halosilane with a bis-hydrido terminated alkyl disiloxane and adding the mixture to water, an acidic aqueous solution, or a basic aqueous solution. Preferably, the alkenyl halosilane and the bis-hydrido terminated alkyl disiloxane are added to water. In an example, no organic solvent is present.

"Alkyl" is a saturated hydrocarbon (e.g., including methyl, ethyl, propyl, butyl, pentyl, hexyl, and other alkyl groups). "Alkenyl" is a hydrocarbon with an unsaturated bond (e.g., including vinyl, allyl, butenyl, pentenyl, hexenyl, heptenyl, and other alkenyl groups, such as norbornenyl). "Disiloxane" is a compound having a formula of $(R)_3$—Si—O—Si—$(R)_3$, where, in the case of an alkyl disiloxane, R is, independently at each occurrence, H or C1-C10 alkyl, and in the case of an alkenyl disiloxane, R is, independently at each occurrence, H, C1-C10 alkyl, and at least one alkenyl. "Bis-hydrido terminated," in the case of an alkyl disiloxane, means that at lease one R on each of the Si atoms is H. "Halo" is F, Cl, Br. and I, preferably the halo group is Cl or Br. and most preferably, Cl. Preferably, the alkenyl halosilane is an alkenyl chlorosilane. Preferably, the alkenyl disiloxane is an alkenyl tetramethyl disiloxane.

Described herein are alkenyl disiloxanes, and more specifically, compounds of Formula I:

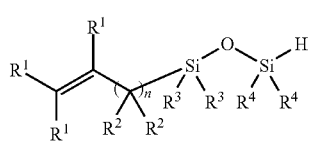

wherein:
n is 0 (meaning that Si is connected directly to the $(R^1)_2C$=$C(R^1)$— group, e.g., vinyl), 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring;
$R^3$ is, independently at each occurrence, H or C1-6 alkyl; and
$R^4$ is, independently at each occurrence, H or C1-6 alkyl.

Preferably, n is 3, 4, or 5. More preferably, n is 4.
Preferably, $R^3$ is C1-3 alkyl at each occurrence. More preferably, $R^3$ is methyl at each occurrence.
Preferably, one of $R^4$ is H and the remaining $R^4$ are C1-3 alkyl at each occurrence. More preferably, one of $R^4$ is H and the remaining $R^4$ are methyl at each occurrence.

In an example, both $R^3$ and two of $R^4$ are methyl (e.g., the compound of Formula I is an alkenyl tetramethyl disiloxane).

In an example, n is 4 and $R^1$ is H at each occurrence. Preferably, $R^2$ is H at each occurrence. Preferably, n is 4, $R^1$ is H at each occurrence, $R^2$ is H at each occurrence, $R^3$ is C1-3 alkyl at each occurrence, and $R^4$ is C1-3 alkyl at each occurrence. More preferably, the compound of Formula I is 1-(hex-5-en-1-yl)-1,1,3,3-tetramethyldisiloxane.

In another example, n is 4, $R^1$ is H at two occurrences and the remaining $R^1$ is alkyl, $R^2$ is alkyl at two occurrences and the remaining $R^2$ are H at each occurrence, $R^3$ is C1-3 alkyl at each occurrence, and $R^4$ is methyl at each occurrence. Preferably, the $R^1$ alkyl and the two $R^2$ alkyl groups combine to form a ring. More preferably, the $R^1$ alkyl is C1 alkyl and the two $R^2$ alkyl groups are each C1 alkyl that are not attached to the same carbon, and, along with the atoms to which they are attached, $R^1$, $R^2$, and $R^2$ combine to form a 5 to 8-membered ring. More preferably, the $R^2$ may be attached to adjacent carbons. More preferably, the compound of Formula I is 5-norbornen-2-yl(ethyl)-1,1,3,3-tetramethyldisiloxane.

In another example, the compound of Formula I is selected from an alkenyl tetramethyl disiloxane (such as, for example, vinyl tetramethyldisiloxane), 1-(hex-5-en-1-yl)-1,1,3,3-tetramethyldisiloxane, or 5-norbornen-2-yl(ethyl)-1,1,3,3-tetramethyldisiloxane.

Described herein are methods for making a compound of Formula I, comprising combining an alkenyl halosilane with a bis-hydrido terminated alkyl disiloxane and adding the mixture to water, an acidic aqueous solution, or a basic aqueous solution. Preferably, the alkenyl halosilane and the bis-hydrido terminated alkyl disiloxane are added to water. Preferably, the alkenyl halosilane is an alkenyl chlorosilane.

In an example of a process for making a compound of Formula I, a compound of Formula A is reacted with a compound of Formula B in the presence of water, an acidic aqueous solution, or a basic aqueous solution:

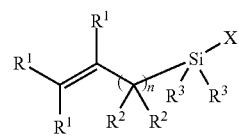

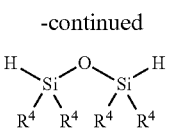

B wherein:

X is F, Cl, Br, or I;

n is 0 (wherein Si is connected directly to the $(R^1)_2C=C(R^1)-$ group, e.g., vinyl), 1, 2, 3, 4, 5, or 6;

$R^1$ is, independently at each occurrence, H or C1-3 alkyl;

$R^2$ is, independently at each occurrence, H or C1-3 alkyl;

also provided that one or more of $R^1$ and one or more of $R^2$ can combine to form a ring;

$R^3$ is, independently at each occurrence, H or C1-6 alkyl; and $R^4$ is, independently at each occurrence, C1-6 alkyl.

Preferably, X is Cl or Br. More preferably, X is Cl.

Preferably, n is 3, 4, or 5. More preferably, n is 4.

Preferably, $R^3$ is C1-3 alkyl at each occurrence. More preferably, $R^3$ is methyl at each occurrence.

In an example, n is 4 and $R^1$ is H at each occurrence. Preferably, $R^2$ is H at each occurrence. Preferably, n is 4, $R^1$ is H at each occurrence, $R^2$ is H at each occurrence, and $R^3$ is C1-3 alkyl at each occurrence. In an example, the compound of Formula A is 5-hexenyldimethylchlorosilane.

In another example, n is 4, $R^1$ is H at two occurrences and the remaining $R^1$ is C1 alkyl, $R^2$ is C1 alkyl at two occurrences and the remaining $R^2$ are H at each occurrence, $R^3$ is C1-3 alkyl at each occurrence, and $R^4$ is methyl at each occurrence. Preferably, the $R^1$ alkyl and the two $R^2$ alkyl groups combine to form a ring. More preferably, the $R^1$ alkyl is C1 alkyl and the two $R^2$ alkyl groups are each C1 alkyl that are not attached to the same carbon, and, along with the atoms to which they are attached, $R^1$, $R^2$, and $R^2$ combine to form a 5 to 8-membered ring. More preferably, the $R^2$ may be attached to adjacent carbons. More preferably, the compound of Formula A is 5-norbornen-2-yl(ethyl)chlorodimethylsilane.

In an example, $R^4$ are C1-3 alkyl at each occurrence. Preferably, $R^4$ are methyl at each occurrence. More preferably, the compound of Formula B is 1,1,3,3,-tetramethyldisiloxane.

The ratio of the compound of Formula A to the compound of Formula B is about 10:1 to about 1:10. Preferably, the ratio of the compound of Formula A to the compound of Formula B is about 1:2 to about 1:0.3. More preferably, the ratio of the compound of Formula A to the compound of Formula B is about 1:1.2 to about 1:0.6. More preferably, the ratio of the compound of Formula A to the compound of Formula B is about 1:1 to about 1:0.8.

The compound of Formula A and the compound of Formula B are mixed at about 20° C. to about 70° C., preferably about 25° C. to about 40° C., and more preferably at room temperature. The compound of Formula A and the compound of Formula B are mixed and then added to water, an acidic aqueous solution, or a basic aqueous solution (e.g., dropwise).

Preferably, the compound of Formula A and the compound of Formula B are mixed and then added to water, an acidic aqueous solution, or a basic aqueous solution at a rate that keeps the reaction temperature under 20° C., more preferably in an ice/water bath. In an example, no organic solvent is present. In an example, no catalyst (e.g., alkali reagent) or buffer is present. The reaction may be advantageous in that it is relatively less exothermic. The reaction mixture is stirred at about 20° C. to about 45° C., preferably about 20C., for about 0.5 to about 2 hours, preferably about 1 hour, after completion of the addition of the compound of Formula A and the compound of Formula B.

A reaction product of the compound of Formula A and the compound of Formula B in the presence of water, an acidic aqueous solution, or a basic aqueous solution, is separated (e.g., the oil phase is taken) and washed with a neutralizing agent such as by an aqueous saturated $NaHCO_3$ solution (e.g., sodium bicarbonate). Alkali carbonates or other bicarbonates (e.g., potassium bicarbonate) or alkaline earth carbonates (e.g. magnesium carbonate) or ammonia may be used in addition to, or instead of, sodium bicarbonate as a neutralizing agent. Without wishing to be bound by theory, the sodium bicarbonate wash step appears to drive the reaction toward completion. Suitable neutralizing agents are known in the art and are commercially available. The resulting separated reaction product comprises the alkenyl disiloxane described above and one or more byproducts.

Unreacted compound of Formula B may be recycled, e.g., recycled from the reaction mixture.

Silanol (e.g., a hydroxylated compound made from the compound of Formula A) is an undesirable byproduct. The amount of silanol in the crude product (e.g., after separating and washing with saturated $NaHCO_3$ solution, but before fractional distillation) is less than about 2:1000 as compared to the alkenyl disiloxane, is less than about 1.5:1000, and less than about is less than about 1:>1000. The amount of silanol in the crude product is determined by gas chromatography (GC), specifically the area under the relevant peak.

Another byproduct is a dimer of two compounds of Formula A, except that the Cl is replaced by a linking O (e.g., $(R^1_2C=CR^1(CR^2_2)_nSiR^3_2)_2-O$). The dimer is removed by fractional distillation. Preferably, the molar ratio of alkenyl disiloxane to dimer in the crude product (before fractional distillation), as determined by proton ($^1H$) nuclear magnetic resonance (NMR), is greater than 5:1, greater than 7:1, greater than 10:1, greater than 13:1, and most preferably, greater than 15:1.

The process may further comprise recovering the alkenyl disiloxane. Recovering the alkenyl disiloxane may be performed by any convenient means such as drying to remove water and/or a separate unit operation to remove the other byproducts described above, such as wiped film evaporation, stripping, or fractional distillation to remove these other byproducts. Drying may be performed by combining the separated product described above with a drying agent. The drying agent may be an adsorbent, such as an inorganic particulate with an average pore size sufficient to adsorb water, for example 10 Å (Angstroms) or less, preferably 5 Å or less, and more preferably 3 Å or less. Examples of adsorbents include zeolites, such as chabasite, mordenite, analcite, and combinations thereof. Examples of adsorbents include molecular sieves such as alkali metal alumino silicates, silica gel, silica-magnesia gel, activated carbon, activated alumina, calcium oxide, and combinations thereof. In another example, the drying agent may be a compound that forms a hydrate at room temperature, for example, one or more of, calcium chloride ($CaCl_2$), sodium sulfate ($Na_2SO_4$) calcium sulfate ($CaSO_4$), and magnesium sulfate ($MgSO_4$). Suitable drying agents are known in the art and are commercially available.

The following examples are for illustrative purposes only and are not intended to limit the scope of the appended claims.

EXAMPLES

Example 1

Synthesis of 1-(hex-5-en-1-yl)-1,1,3,3-tetramethyldisiloxane 1-(hex-5-en-1-yl)-1,1,3,3-tetramethyldisiloxane (1) was prepared according to the following reaction:

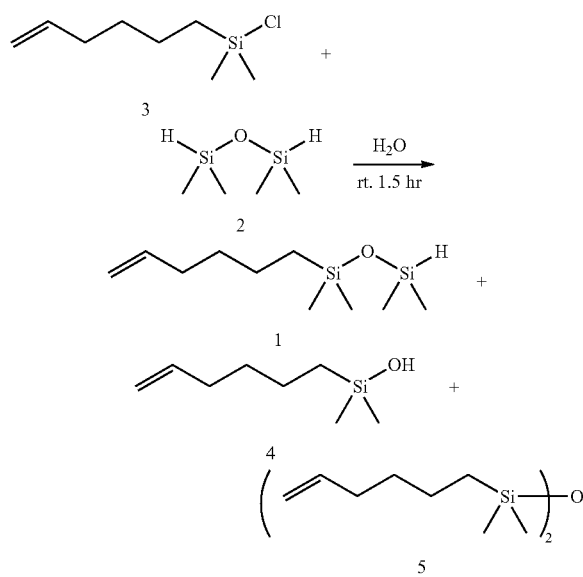

where 4 and 5 are byproducts. The chemical names, corresponding structures, and numerical abbreviations used below are given in TABLE 1.

A 100 mL round-bottom ("RB") flask containing 20 mL deionized water was equipped with a magnetic stir bar. At room temperature, a mixture of 1,1,3,3-tetramethyldisiloxane (2, 4.6 grams) and 5-hexenyldimethylchlorosilane (3, 10 gram, 95% purity, containing 5% isomers with internal olefin) was slowly added over a period of five minutes. The molar ratio of 2:3 was 0.6:1.

After addition, the mixture was further stirred at room temperature for 1 hour. The organic layer (top layer) was separated, washed with saturated aqueous NaHCO$_3$ (20 mL) and water (20 mL), and dried over MgSO$_4$. After filtration, the crude product was a colorless, clear liquid comprising a mixture of compounds 1, 2, 4, and 5. Their quantities were analyzed by proton ($^1$H) nuclear magnetic resonance (NMR) and gas chromatography (GC). Using $^1$H NMR, the molar ratio of 1:5 (e.g., desired product to dimer) in the crude product was 7.2:1. Using GC, the ratio of 1:4 (e.g., desired product to silanol) in the crude product was >1000:1, and the yield of 1 in the crude product was 68%.

Example 2

Synthesis of 1-(hex-5-en-1-yl)-1,1,3,3-tetramethyldisiloxane

A reaction was carried out using a process substantially similar to that described with respect to Example 1, except that 6.1 grams of 1,1,3,3-tetramethyldisiloxane (2) was used. The molar ratio of 2:3 was 0.8:1.

Using $^1$H NMR, the molar ratio of 1:5 (e.g., desired product to dimer) in the crude product was 13.2:1. Using GC, the ratio of 1:4 (e.g., desired product to silanol) in the crude product was >1000:1, and the yield of 1 in the crude product was 78%.

TABLE 1

| Chemical name | Structure | Abbreviation |
| --- | --- | --- |
| 1-(hex-5-en-1-yl)-1,1,3,3-tetramethyldisiloxane | | 1 |
| 1,1,3,3,-tetramethyldisiloxane | | 2 |
| 5-hexenyldimethylchlorosilane | | 3 |
| 5-hexenyldimethylsilanol | | 4 |
| 1,3-di(hex-5-en-1-yl)-1,1,3,3-tetramethyldisiloxane | | 5 |

Example 3

Synthesis of 1-(hex-5-en-1-yl)-1,1,3,3-tetramethyldisiloxane

A reaction was carried out using a process substantially similar to that described with respect to Example 1, except that 7.7 grams of 1,1,3,3-tetramethyldisiloxane (2) was used. The molar ratio of 2:3 was 1.1:1.

Using $^1$H NMR, the molar ratio of 1:5 (e.g., desired product to dimer) in the crude product was 16.2:1. Using GC, the ratio of 1:4 (e.g., desired product to silanol) in the crude product was >1000:1, and the yield of 1 in the crude product was 86%.

Example 4

Synthesis of 1-(hex-5-en-1-yl)-1,1,3,3-tetbamethyldisiloxane

A reaction was carried out using a process substantially similar to that described with respect to Example 1, except that 10% aqueous HCl was used instead of the deionized water in the 100 mL RB flask. During addition, the aqueous HCl was cooled to about 5° C. with an ice/water bath.

Using $^1$H NMR, the molar ratio of 1:5 (e.g., desired product to dimer) in the crude product was 7.2:1. Using GC, the ratio of 1:4 (e.g., desired product to silanol) in the crude product was >1000:1, and the yield of 1 in the crude product was 61%.

Example 5

Synthesis of 5-norbornen-2-yl(ethyl)-1,1,3,3-tetramethyldisiloxane 5-norbornen-2-yl(ethyl)-1,1,3,3-tetramethyldisiloxane (7) was prepared according to the following reaction:

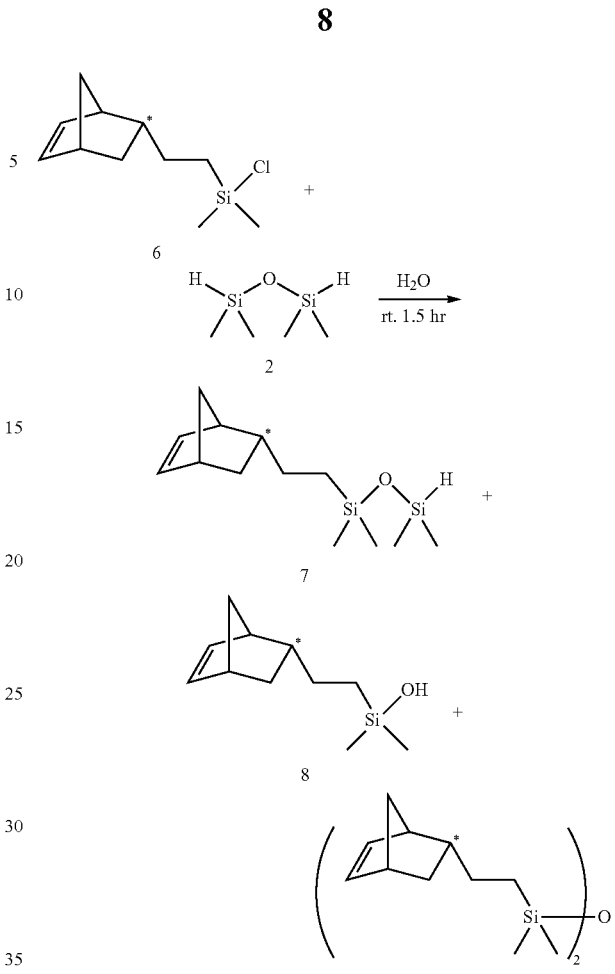

where 8 and 9 are byproducts. The chemical names, corresponding structures, and numerical abbreviations used below are given in TABLE 2.

TABLE 2

| Chemical name | Structure | Abbreviation |
| --- | --- | --- |
| 1,1,3,3,-tetramethyldisiloxane | | 2 |
| 5-norbornen-2-yl(ethyl) chlorodimethylsilane | | 6 |
| 1-(5-norbornen-2-yl-ethyl)-1,1,3,3-tetramethyldisiloxane | | 7 |

TABLE 2-continued

| Chemical name | Structure | Abbreviation |
|---|---|---|
| 5-norbornen-2-yl(ethyl) dimethylsilanol | | 8 |
| 1,3-di(5-norbornen-2-yl-ethyl)-1,1,3,3-tetramethyldisiloxane | | 9 |

A 500 mL RB flask containing 100 g deionized water was equipped with a magnetic stir bar and a dropping funnel and cooled with ice/water bath to <5° C. A mixture of 5-norbornen-2-yl(ethyl)chlorodimethylsilane 6 (endo/exo mixture, 50.0 gram, 0.23 mol) and 1,1,3,3-tetramethyldisiloxane 2 (31.3 gram, 0.23 mol, 1.0 equiv.) was added to the dropping funnel. The reaction mixture was slowly added to the flask with vigorous stirring. After addition, the ice-bath was removed, and the flask was stirred for 1 hour at room temperature.

The organic phase (top layer) was separated, washed with sat aq. NaHCO₃ (50 mL) and deionized water (50 mL), then dried over MgSO₄. After filtration, the crude product was obtained as a clear colorless liquid (64.4 gram). The crude product was further purified by fractional distillation under high vacuum at 120-130° C. to give 7 as colorless clear liquid: 42.0 gram, 71% yield, as a 5:1 mixture of endo:exo isomers.

Major isomer $^1$H NMR (400 MHz, CDCl₃): 6.10 (dd, J=4 & 8 Hz, 1H), 5.90 (dd, J=4 & 8 Hz, 1H), 4.69 (m, 1H), 2.80 (br., 1H), 2.74 (br. 1H), 1.94 (m, 1H), 1.84 (m, 1H), 1.42-1.03 (m, 4H), 0.62-0.47 (m, 3H), 0.16 (s, 3H), 0.16 (s, 3H), 0.05 (s, 6H); $^{13}$C NMR (100 MHz, CDCl₃): 136.9, 132.2, 49.5, 45.0, 42.6, 42.1, 32.4, 28.0, 17.0, 0.9, −0.06, −0.09; $^{29}$Si NMR (79 MHz, CDCl₃): 9.8, −7.1 ppm.

Minor isomer: $^1$H NMR (400 MHz, CDCl₃): 6.09 (dd, J=4 & 8 Hz, 1H), 6.02 (dd, J=4 & 8 Hz, 1H), 4.69 (m, 1H), 2.77 (br., 1H), 2.54 (br. 1H), 1.42-1.08 (m, 6H), 0.62-0.47 (m, 3H), 0.17 (s, 3H), 0.16 (s, 3H), 0.07 (s, 6H); $^{13}$C NMR (100 MHz, CDCl₃): 136.9, 136.2, 45.9, 45.1, 42.1, 41.8, 33.0, 29.8, 17.4, 0.9, −0.02, −0.06; $^2$Si NMR (79 MHz, CDCl₃): 9.7, −7.0 ppm.

It is understood that this disclosure is not limited to the embodiments specifically disclosed and exemplified herein. Various modifications of the invention will be apparent to those skilled in the art. Such changes and modifications may be made without departing from the scope of the appended claims. Moreover, each recited range includes all combinations and sub-combinations of ranges, as well as specific numerals contained therein.

The invention claimed is:

1. A process for making alkenyl disiloxanes, comprising: combining an alkenyl halosilane with a bis-hydrido terminated alkyl disiloxane and adding the mixture to water, an acidic aqueous solution, or a basic aqueous solution.

2. The process of claim 1, wherein the ratio of the alkenyl halosilane to the bis-hydrido terminated alkyl disiloxane is about 1:1.2 to about 1:0.6.

3. The process of claim 1, wherein the alkenyl halosilane to the bis-hydrido terminated alkyl disiloxane are mixed at about 20° C. to about 45° C.

4. The process of claim 1, further comprising separating D reaction product including the alkenyl disiloxane, thereby forming separated reaction product and washing the separated reaction product with an aqueous solution of a neutralizing agent.

5. The process of claim 4, where the aqueous solution is saturated NaHCO₃ solution.

6. The process of claim 4, further comprising drying the separated reaction product after washing.

7. The process of claim 1, further comprising recovering the alkenyl disiloxane.

8. The process of claim 1, wherein the alkenyl disiloxane is a compound of a Formula I:

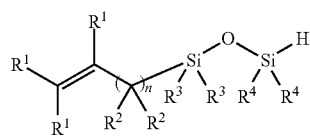

wherein:

n is 0, 1, 2, 3, 4, 5, or 6;

R$^1$ is, independently at each occurrence, H or C1-3 alkyl;

R$^2$ is, independently at each occurrence, H or C1-3 alkyl;

also provided that one or more of R$^1$ and one or more of R$^2$ can combine to form a ring;

R$^3$ is, independently at each occurrence, H or C1-6 alkyl; and

R$^4$ is, independently at each occurrence, C1-6 alkyl.

9. The process of claim 8, wherein the compound of Formula I is 1-(hex-5-en-1-yl)-1,1,3,3-tetramethyldisiloxane or 5-norbornen-2-yl(ethyl)-1,1,3,3-tetramethyldisiloxane.

10. The process of claim 1, wherein the alkenyl halosilane is a compound of a Formula A:

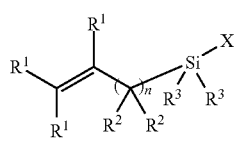

wherein:
X is F, Cl, Br, or I;
n is 0, 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring; and
$R^3$ is, independently at each occurrence, H or C1-6 alkyl.

11. The process of claim 1, wherein the alkenyl halosilane is 5-hexenyldimethylchlorosilane or 5-norbornen-2-yl(ethyl)chlorodimethylsilane.

12. The process of claim 1, wherein the bis-hydrido terminated alkyl disiloxane is a compound of a Formula B:

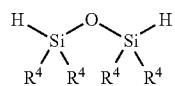

wherein:
$R^4$ is, independently at each occurrence, C1-6 alkyl.

13. The process of claim 1, wherein the bis-hydrido terminated alkyl disiloxane is 1,1,3,3,-tetramethyldisiloxane.

14. The process of claim 5, further comprising drying the separated reaction product after washing.

15. The process of claim 2, wherein the alkenyl disiloxane is a compound of a Formula I:

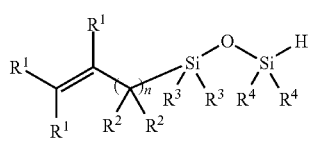

wherein:
n is 0, 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring;
$R^3$ is, independently at each occurrence, H or C1-6 alkyl; and
$R^4$ is, independently at each occurrence, C1-6 alkyl.

16. The process of claim 3, wherein the alkenyl disiloxane is a compound of a Formula I:

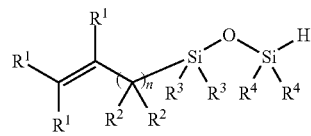

wherein:
n is 0, 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring;
$R^3$ is, independently at each occurrence, H or C1-6 alkyl; and
$R^4$ is, independently at each occurrence, C1-6 alkyl.

17. The process of claim 2, wherein the alkenyl halosilane is a compound of a Formula A:

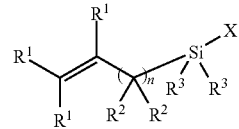

wherein:
X is F, Cl, Br, or I;
n is 0, 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring; and
$R^3$ is, independently at each occurrence, H or C1-6 alkyl.

18. The process of claim 3, wherein the alkenyl halosilane is a compound of a Formula A:

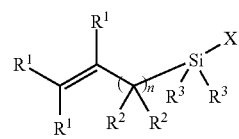

wherein:
X is F, Cl, Br, or I;
n is 0, 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring; and
$R^3$ is, independently at each occurrence, H or C1-6 alkyl.

19. The process of claim 2, wherein the bis-hydrido terminated alky disiloxane is a compound of a Formula B:
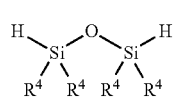
wherein:
$R^4$ is, independently at each occurrence, C1-6 alkyl.
20. The process of claim 3, wherein the bis-hydrido terminated alky disiloxane is a compound of a Formula B:
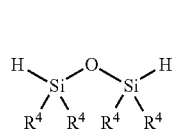
wherein:
$R^4$ is, independently at each occurrence, C1-6 alkyl.
* * * * *